June 14, 1927.
F. W. LORD
POULTRY FEEDER
Filed April 22, 1926
1,632,738
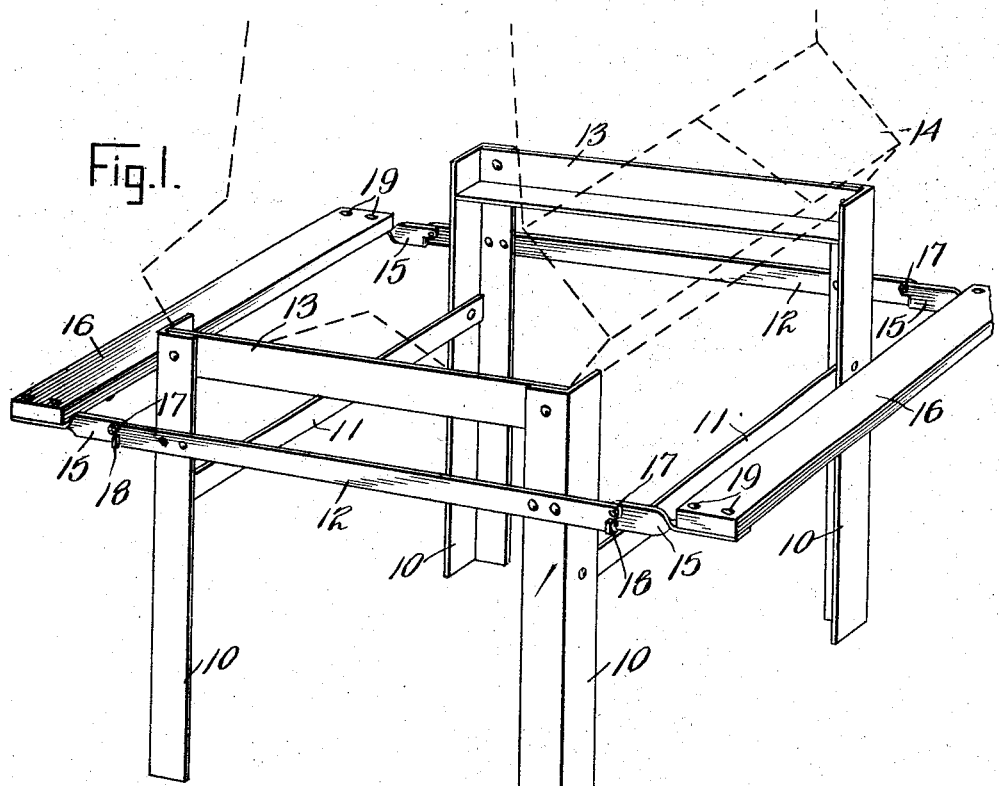
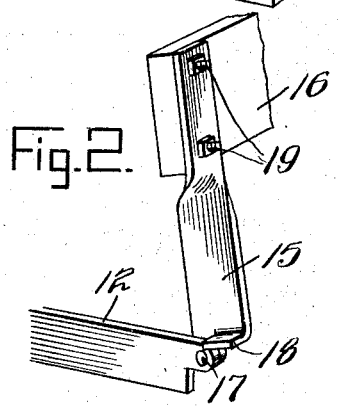
Inventor
Fred W. Lord
By  [signature]
Attorney Patented June 14, 1927.

1,632,738

UNITED STATES PATENT OFFICE.

FRED W. LORD, OF TIPTON, INDIANA, ASSIGNOR TO THE OAKES MANUFACTURING COMPANY, OF TIPTON, INDIANA, A CORPORATION OF INDIANA.

POULTRY FEEDER.

Application filed April 22, 1926. Serial No. 103,920.

My said invention relates to poultry feeders and one object of the invention is to provide a perch which may be held in one position to support the fowls when feeding and which may be folded up to prevent the same from being used as a roost, all as will be hereinafter more fully described and claimed.

Referring to the accompanying drawings which are made a part hereof and on which similar reference characters indicate similar parts, Figure 1 is a perspective of a poultry feeder having my invention applied thereto, and Figure 2, a detailed view.

Reference character 10 indicates the legs of a poultry feeder having braces 11 and 12 and cross members 13 for supporting feeding troughs 14 which may be protected in any desired manner to prevent the fowls from scratching the feed out of the same.

Mounted on the ends of the braces 12 which extend across the ends of the frame are perch supports 15, each being preferably twisted at right angles to conform to the flat face of a perch 16 at substantially right angles, each perch support is pivoted at 17 to an ear of the brace 12 and said perch support has a laterally extending lug 18, for engagement with the end of the brace, to prevent the perch support from being depressed below a horizontal plane. Each perch 16 extends along the side of the feeder and is secured adjacent its ends to the perch supports by means of bolts 19.

From the foregoing it will be understood that the perch may be moved to position shown in Figure 2 at the close of the day or any time when it is not desirable to have the fowls thereon and the perch will remain snugly beneath the side of the frame in a position inaccessible to the fowls. The fowls may be therefore prevented from roosting upon the feeder during the night time and with the minimum care may be caused to seek other places of refuge.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A poultry feeder comprising a frame, a perch support pivoted to said frame and having laterally disposed lugs for engagement with the frame when the perch support is in substantially horizontal position and a perch mounted on said support, substantially as set forth.

2. A poultry feeder comprising a frame having a plurality of spaced uprights forming legs and horizontally disposed cross bars connecting said legs and holding them in fixed relation relative to each other one of said cross bars projecting beyond the legs at each side of the frame for supporting a perch, supporting bars pivotally mounted on the projecting portions of a pair of said cross bars in a manner to prevent their being moved with the perch below a horizontal plane, substantially as set forth.

3. A poultry feeder comprising a frame, a cross bar on said frame, a perch support pivoted on said cross bar, a perch mounted on said support and movable from a substantially horizontal position for supporting fowls to a position in which fowls cannot perch thereon, laterally disposed elements on said perch support adapted to engage said cross bar for holding the perch support and perch in a substantially horizontal position, substantially as set forth.

In witness whereof, I have hereunto set my hand at Tipton, Indiana, this 17th day of April, A. D. nineteen hundred and twenty-six.

FRED W. LORD.